US012154710B2

(12) United States Patent
Modi et al.

(10) Patent No.: US 12,154,710 B2
(45) Date of Patent: Nov. 26, 2024

(54) PACKAGE EMBEDDED MAGNETIC POWER TRANSFORMERS FOR SMPS

(71) Applicant: Intel Corporation, Santa Clara, CA (US)

(72) Inventors: Anuj Modi, Tempe, AZ (US); Huong Do, Chandler, AZ (US); William J. Lambert, Tempe, AZ (US); Krishna Bharath, Phoenix, AZ (US); Harish Krishnamurthy, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 922 days.

(21) Appl. No.: 17/025,537

(22) Filed: Sep. 18, 2020

(65) Prior Publication Data

US 2022/0093314 A1 Mar. 24, 2022

(51) Int. Cl.
*H01F 27/24* (2006.01)
*H01F 30/06* (2006.01)

(52) U.S. Cl.
CPC ............. *H01F 27/24* (2013.01); *H01F 30/06* (2013.01)

(58) Field of Classification Search
CPC .......... H01F 27/24; H01F 30/06; H01F 30/16; H01F 17/06; H01F 17/062
See application file for complete search history.

(56) References Cited

U.S. PATENT DOCUMENTS

| | | | | | |
|---|---|---|---|---|---|
| 4,536,733 | A * | 8/1985 | Shelly | H05K 1/165 336/200 |
| 5,257,000 | A * | 10/1993 | Billings | H01F 41/046 336/200 |
| 5,543,773 | A * | 8/1996 | Evans | H01F 30/16 336/200 |
| 7,671,716 | B2 * | 3/2010 | Chen | H01F 17/0033 336/200 |
| 2003/0025585 | A1 * | 2/2003 | Macerini | H01F 27/2804 29/606 |
| 2006/0152322 | A1 * | 7/2006 | Whittaker | H05K 3/429 336/200 |
| 2014/0043131 | A1 * | 2/2014 | Dalmia | H01F 5/003 336/200 |
| 2016/0111966 | A1 * | 4/2016 | Wang | H01F 27/2804 336/200 |

* cited by examiner

*Primary Examiner* — Malcolm Barnes
(74) *Attorney, Agent, or Firm* — Schwabe, Williamson & Wyatt P.C.

(57) ABSTRACT

Embodiments disclosed herein include power transformers for microelectronic devices. In an embodiment, a power transformer comprises a magnetic core that is a closed loop with an inner dimension and an outer dimension, and a primary winding around the magnetic core. In an embodiment, the primary winding has a first number of first turns connected in series around the magnetic core. In an embodiment, a secondary winding is around the magnetic core, and the secondary winding has a second number of second turns around the magnetic core. In an embodiment, individual ones of the second turns comprise a plurality of secondary segments connected in parallel.

8 Claims, 11 Drawing Sheets

PACKAGE EMBEDDED MAGNETIC POWER TRANSFORMERS FOR SMPS

FIELD

Embodiments relate to packaging semiconductor devices. More particularly, the embodiments relate to electronic packages with embedded magnetic power transformers for switched-mode power supply (SMPS) operations.

BACKGROUND

In existing electronic packaging architectures, the switched-mode power supply (SMPS) primarily utilizes buck circuitry topology and closely related derivatives. The use of such circuitry is largely driven by limitations of presently available transformer architectures. For example, existing package integrated transformers suffer from a high leakage inductance. That is, the inductive coupling of such transformers is too low. As such, so-called isolated SMPS technologies, such as fly-back power supplies, forward power supplies, and full-bridge power supplies (which require low-loss operation of the transformer) are not currently feasible.

Transformers with suitably low losses have been proposed for integration into package architectures, but they are not without issue. One such proposal uses a discrete magnetic core that is clamped around a printed circuit board (PCB). The windings around the magnetic core can then be implemented using the PCB routing. However, the construction and routing techniques used are not suitable for the type of package embedding required for a fully integrated voltage regulator (FIVR) style solution.

Additionally, discrete transformers are too thick for die side assembly for many applications of interest since assembly rules, maximum thicknesses, etc. severely limit the number of locations on the package where such a component could be placed. Another issue with discrete transformers is that most SMPS require highly customized transformer design, as opposed to using a high-volume off-the-shelf component. Therefore, providing customized design of discrete transformers results in a significant increase in the cost.

DETAILED DESCRIPTION

Figure 1:
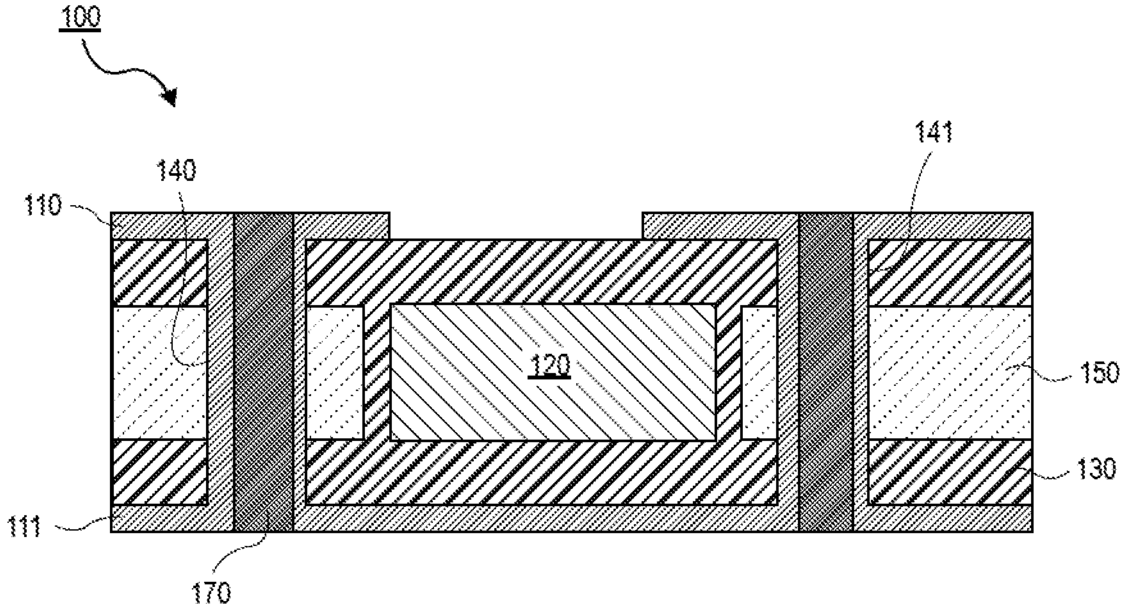
FIG. 1 is an illustration of a cross-sectional view of package substrate with an inductor disposed around an embedded magnetic core, in accordance with an embodiment.

Described herein are electronic packages with highly coupled transformers, in accordance with various embodiments. In the following description, various aspects of the illustrative implementations will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative implementations. However, it will be apparent to one skilled in the art that the present invention may be practiced without the specific details. In other instances, well-known features are omitted or simplified in order not to obscure the illustrative implementations.

Various operations will be described as multiple discrete operations, in turn, in a manner that is most helpful in understanding the present invention, however, the order of description should not be construed to imply that these operations are necessarily order dependent. In particular, these operations need not be performed in the order of presentation.

As noted above, switched-mode power supply (SNIPS) architectures are currently limited by transformers with relatively high losses. As such, isolated SMPS architectures that provide better performance are not currently a feasible option. Isolated SMPS topologies (such as fly-back, forward, and full-bridge) have several beneficial characteristics. For example, they provide high conversion ratios between the input and output voltage by controlling the turns ratio of the transformer. Controlling the ratio of the turns is difficult for currently used buck converters. Isolated SMPS topologies can also be stacked in order to reduce the voltage handled by each converter. This allows for faster, lower-voltage switches to be used.

Accordingly, embodiments disclosed allow for isolated SMPS topologies to be embedded directly in the package substrate. The highly coupled transformers disclosed herein may facilitate voltage conversion from $V_{IN}$=12V or larger to $V_{OUT}$=1.8V or 1.0V in the switching frequency range of 5 MHz to 100 MHz. Such embodiments also allow for the creation of custom highly-coupled transformer arrays instead of relying on individual surface mounted components. As such, cost savings are provided and there is no increase to the Z-height of the electronic package.

In an embodiment, a magnetic core is embedded in the package core layer. Windings are formed around the magnetic core using traces, vias, and plated through holes through the package core layer. The transformers described herein allow for flexibility in deciding the turn ratio. For example transformation ratios may range from 1:1 to 8:1, or even higher. Additionally, the primary winding and the secondary winding may be interleaved to provide a high coupling coefficient. The high coupling coefficient may be provided by forming the secondary windings with a plurality of electrically parallel segments. As such, the secondary winding may be interleaved with the each of the turns of the primary winding. Coupling factors of transformers disclosed herein may be 0.9 or above. Embodiments herein also allow for balancing the resistance of the primary and secondary windings. For example, in a 4:1 transformer, the current in the primary winding will be approximately four times lower than the current in the secondary winding. Since the DC power dissipation is proportional to current squared, it is desirable for the DC resistance in the secondary winding to be much lower than that of the primary winding in order to optimize losses for a fixed volume of copper.

To provide context, an example of an inductor 100 is shown in FIG. 1, and a process for forming the inductor is shown in FIGS. 2A-2I. The inductor 100 may have structural components that are similar to the structural components needed for the fabrication of transformers described in greater detail below. That is, instead of a single winding shown in FIGS. 1-2I, a primary winding and a secondary winding are provided to form a transformer.

Referring now to FIG. 1, a cross-sectional illustration of an inductor 100 is shown, in accordance with an embodiment. The inductor 100 may comprise a package substrate core 150. In an embodiment, a magnetic core 120 is embedded in the package substrate core 150. A dielectric layer 130 may be provided over the magnetic core 120 and the package substrate core 150. The dielectric layer 130 may be a material suitable for providing routing layers in an electronic package. For example, a first routing layer comprising traces 110 may be disposed above the dielectric layer 130, and a second routing layer 111 may be disposed below the dielectric layer 130. In an embodiment, the dielectric layer 130 may also separate the magnetic core 120 from the package substrate core 150. The inductor 100 may comprise plated through holes (PTH) 140 and 141. The PTHs 140 and 141 may be electrically coupled to each other by the second routing layer 111. The PTHs 140 and 141 may be filled with an insulative plug 170. In FIG. 1, the inductor 100 includes routing on the first layers above and below the package substrate core 150. However, it is to be appreciated that the routing (e.g., to connect PTH 140 to PTH 141) may be implemented on any layer of the package substrate.

Referring now to FIGS. 2A-2I, a series of cross-sectional illustrations of a process for fabricating an inductor 200 similar to the inductor 100 in FIG. 1 is shown, in accordance with an embodiment.

Figure 2A:
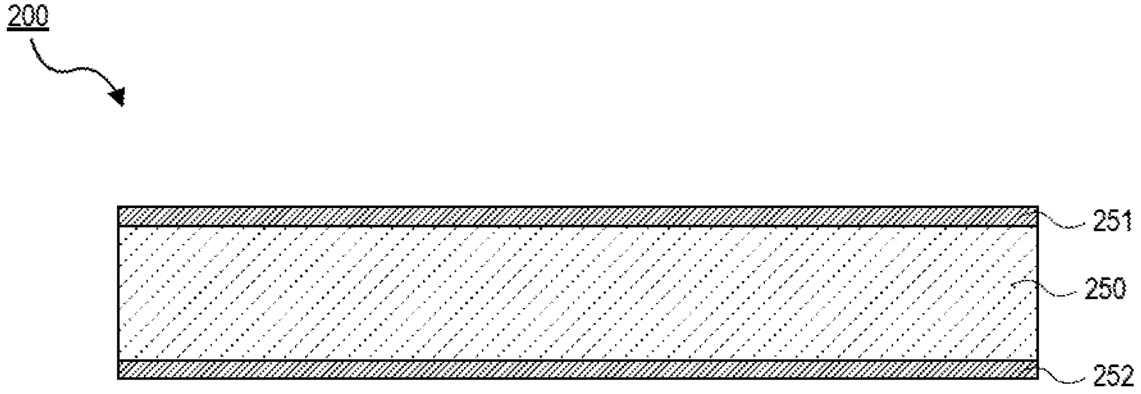
FIGS. 2A-2I are illustrations of cross-sectional views of a process flow to form the inductor in FIG. 1, in accordance with an embodiment.

Referring now to FIG. 2A, a cross-sectional illustration of the inductor 200 at an initial stage of manufacture is shown, in accordance with an embodiment. At this stage, the inductor 200 comprises a package substrate core 250 with foil layers 251 and 252 over the top and bottom surfaces, respectively.

Figure 2B:
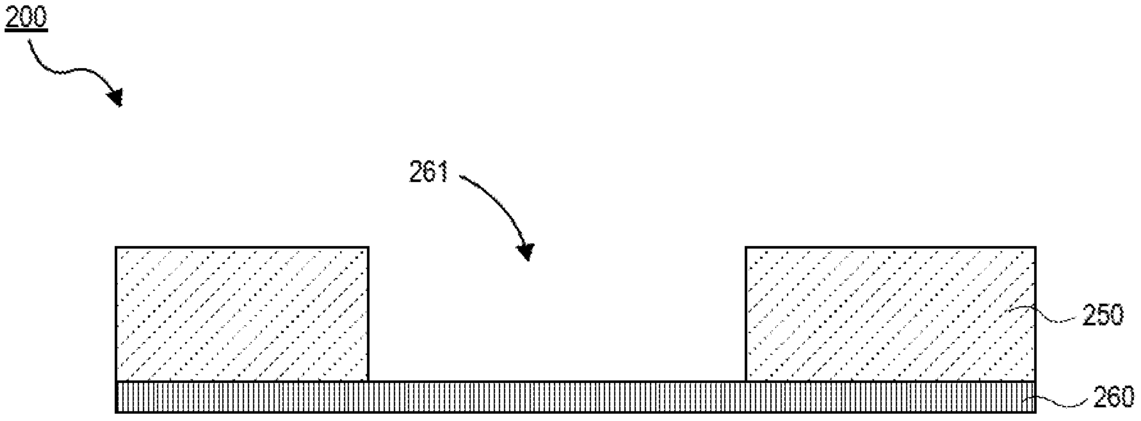

Referring now to FIG. 2B, a cross-sectional illustration of the inductor 200 after the package substrate core 250 is attached to a backing tape 260, and an opening 261 is formed through the package substrate core 250 is shown, in accordance with an embodiment. In an embodiment, the foil layers 251 and 252 may be removed before attaching the package substrate core 250 to the backing tape 260. In other embodiments, the package substrate core 250 may be supplied without foil layers 251 and 252, and the operation of removing the foil layers 251 and 252 may not be necessary.

Figure 2C:
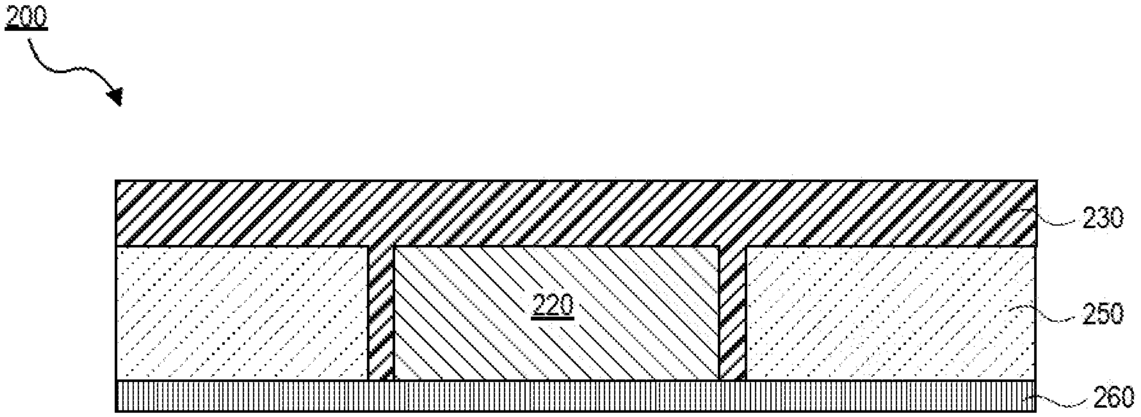

Referring now to FIG. 2C, a cross-sectional illustration of the inductor 200 after a magnetic core 220 is placed in the opening 261 and a dielectric layer 230 is provided over the package substrate core 250 is shown, in accordance with an embodiment. In an embodiment, the dielectric layer 230 may also fill remaining portions of the opening 261. In an embodiment, the magnetic core 220 may be a toroid or some other 3D shape.

Figure 2D:
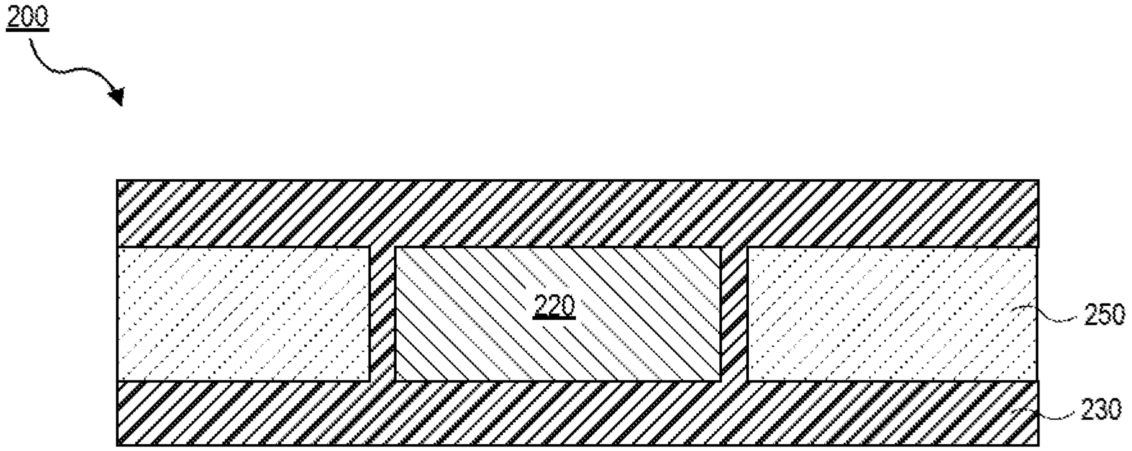

Referring now to FIG. 2D, a cross-sectional illustration of the inductor 200 after the backing tape 260 is removed and an additional portion of the dielectric layer 230 is provided below the magnetic core 220 and the package substrate core 250.

Figure 2E:
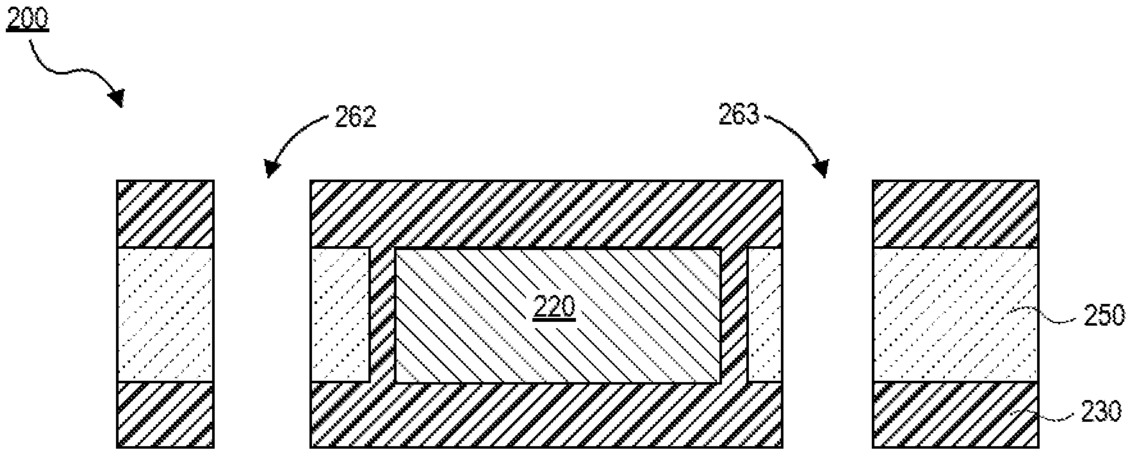

Referring now to FIG. 2E, a cross-sectional illustration of the inductor 200 after through hole openings 262 and 263 are provided through the dielectric layer 230 and the package substrate core 250 is shown, in accordance with an embodiment. The through hole openings 262 and 263 may be formed with a laser drilling process, a mechanical drilling process, or any other suitable process.

Figure 2F:
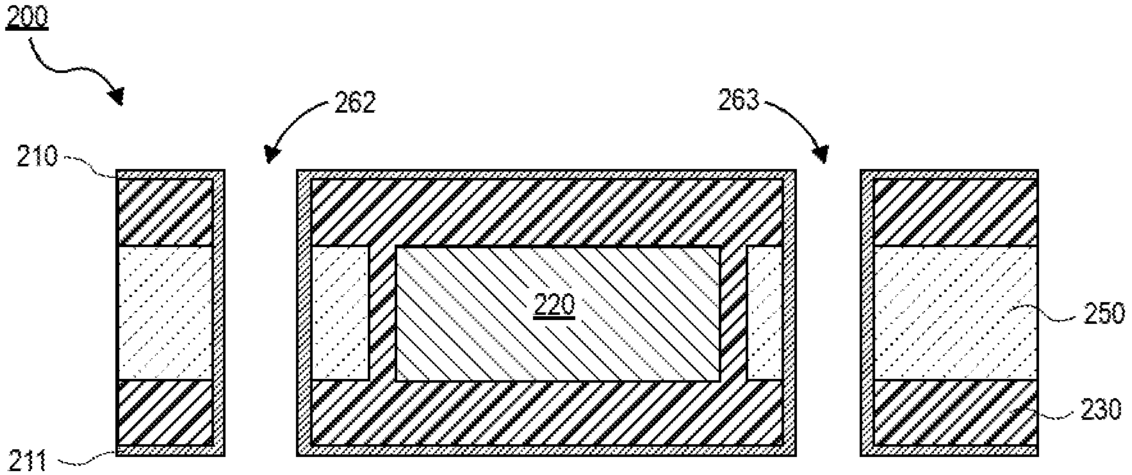

Referring now to FIG. 2F, a cross-sectional illustration of the inductor 200 after a conductive layer 210/211 is disposed over the exposed surfaces is shown, in accordance with an embodiment. In an embodiment, the conductive layer 210/211 lines the sidewalls of the through hole openings 262 and 263.

Figure 2G:
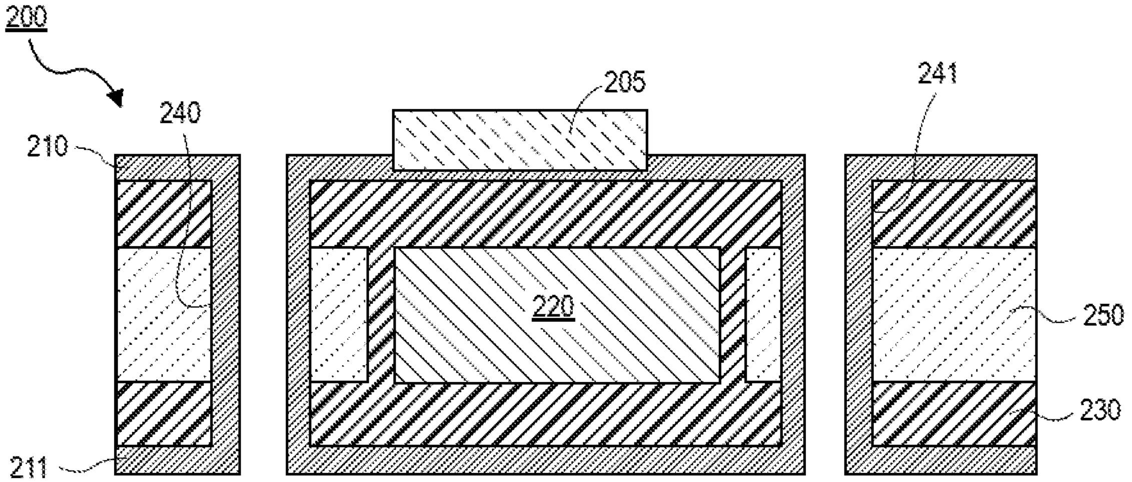

Referring now to FIG. 2G, a cross-sectional illustration of the inductor 200 after a mask layer 205 is disposed over a portion of the conductive layer 210, and additional metal deposition is provided is shown, in accordance with an embodiment. The mask layer 205 is provided at locations where the conductive layer 210 is desired to be completely removed in a subsequent processing operation. Plated through holes 240 and 241 may be deposited through the through hole openings 262 and 263.

Figure 2H:
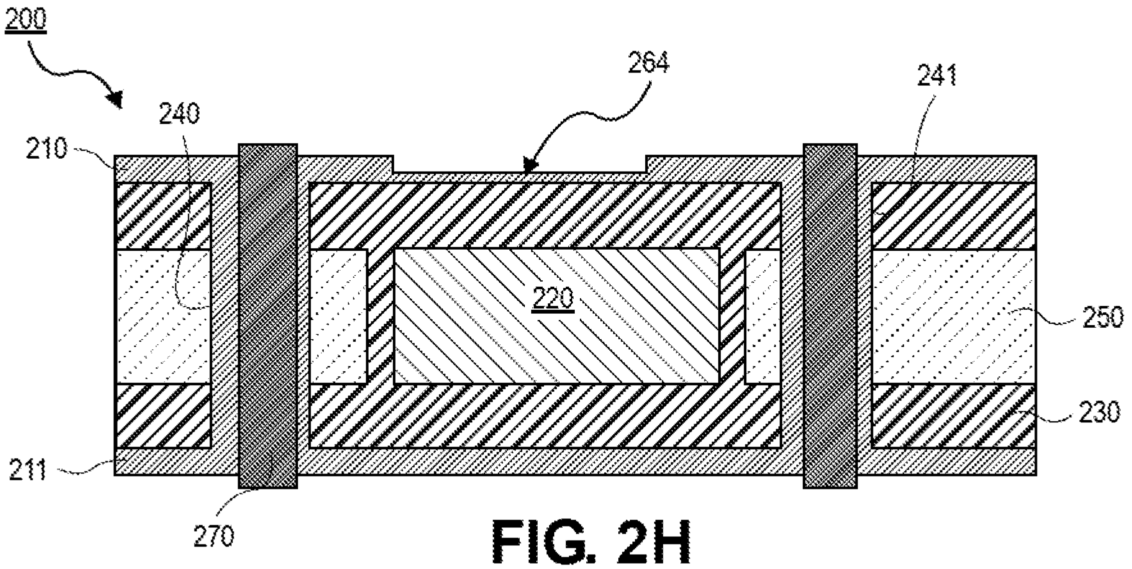

Referring now to FIG. 2H, a cross-sectional illustration of the inductor 200 after insulative plugs 270 are provided in the openings 262 and 263, and the mask layer 205 is removed is shown, in accordance with an embodiment. The removal of the mask layer 205 results in the exposure of a thin conductive layer 264 (i.e., a layer that is thinner than the conductive layer 210.

Figure 2I:
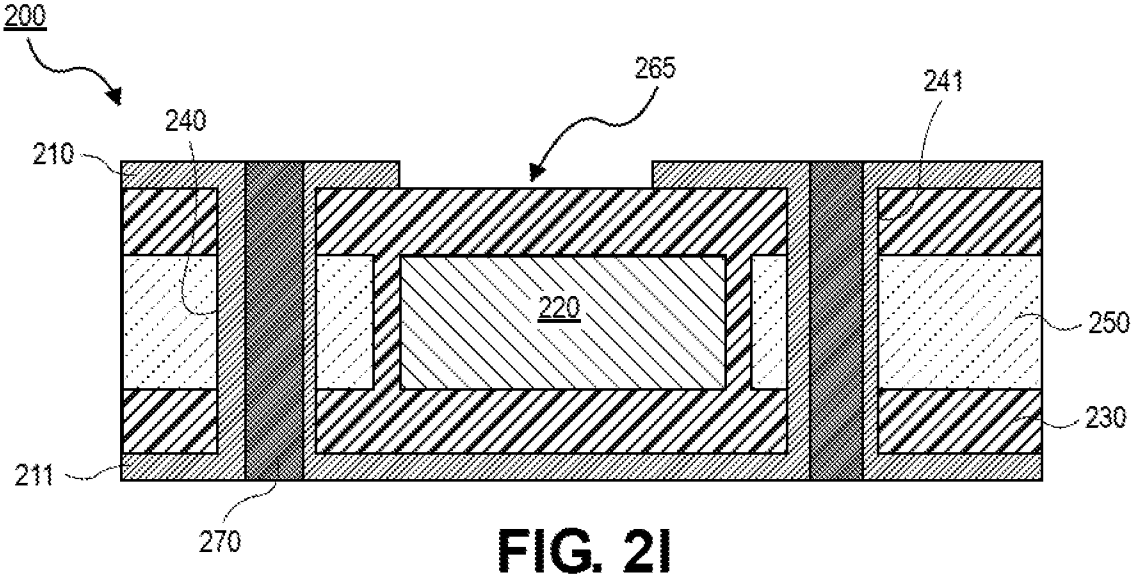

Referring now to FIG. 2I, a cross-sectional illustration of the inductor 200 after an etch to remove the thin conductive layer 264 is shown, in accordance with an embodiment. The removal of the conductive layer 264 provides a gap 265 between portions of the conductive layer 210. As such, an inductor loop is provided around the embedded magnetic core 220. The inductor loop comprises the left side of conductive layer 210, the PTH 240, the conductive layer 211, the PTH 241, and the right side of conductive layer 210. In the illustrated embodiment, the PTHs 240 and 241 are shown as being uncapped. However, it is to be appreciated that embodiments disclosed herein include both capped and uncapped PTHs 240 and 241.

As noted above, the formation of an inductor using an embedded magnetic core provides the foundation for forming transformer architectures such as those described herein. That is, transformers may be fabricated using a primary winding including one or more turns and a secondary winding including one or more turns. Each turn of the primary winding and the secondary winding may have a structure similar to the inductors 100 and 200 described above.

Figure 3A:
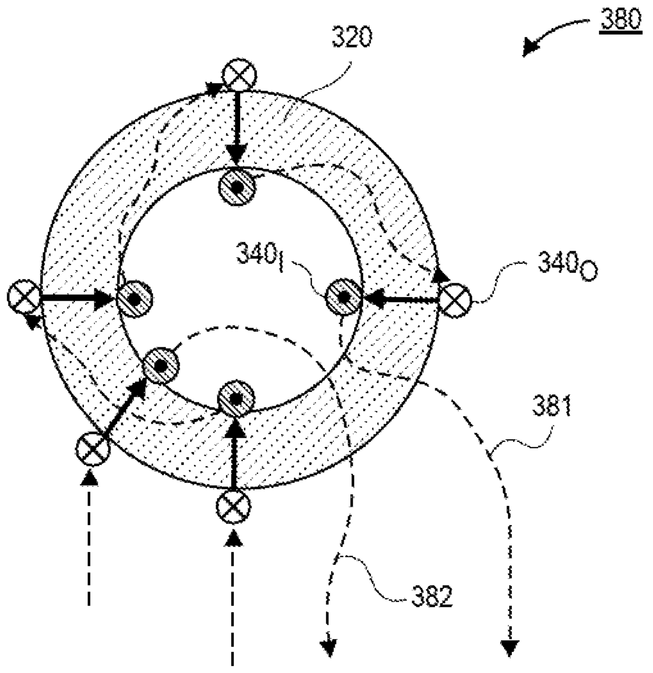
FIG. 3A is a schematic illustration of a transformer with a 4:1 turn ratio, in accordance with an embodiment.

A schematic of a transformer 380 in accordance with such an embodiment is shown in FIG. 3A. As shown, a magnetic core 320 is provided embedded in a package substrate core (not shown). The magnetic core 320 may have a toroidal shape with an inner diameter and an outer diameter. However, the magnetic core 320 may have any shape suitable for a core around which conductive features are wound. The magnetic core 320 may be any suitable magnetic material. For example, the magnetic material may include, but is not limited to, ferromagnetic (or ferrite) materials, conductive materials (or powders), epoxy materials, combinations thereof, and/or any similar magnetic materials. For example, the magnetic materials may include microparticles formulations such as microparticles comprising iron-silicon, iron-cobalt, iron-nickel, and the like.

A primary winding 381 may comprise a plurality of turns that are connected in series. In FIG. 3A, the dashed lines indicate a trace below the magnetic core 320 and the solid lines indicate a trace above the magnetic core 320. As shown, four turns around the magnetic core 320 are made by the primary winding 381. Each turn may comprise a PTH 340 from below the magnetic core 320 to above the magnetic core 320 (indicated with an X) and a PTH 340 from above the magnetic core 320 to below the magnetic core (indicated with a dot). As used herein when the subscript "O" is used for the PTH (e.g., PTH $\mathbf{340}_O$), the PTH 340 is outside an outer diameter of the magnetic core 320, and when the subscript "I" is used for the PTH (e.g., PTH $\mathbf{340}_I$), the PTH 340 is inside an inner diameter of the magnetic core 320.

A secondary winding 382 may comprise one or more turns. In FIG. 3A, the secondary winding has a single turn to provide a 4:1 turn ratio (primary:secondary). However, it is to be appreciated that any number of turns for the primary and secondary windings may be used to provide a desired turn ratio. However, having a higher turn ratio using an architecture such as the one shown in FIG. 3A results in decreased coupling efficiency.

Figure 3B:
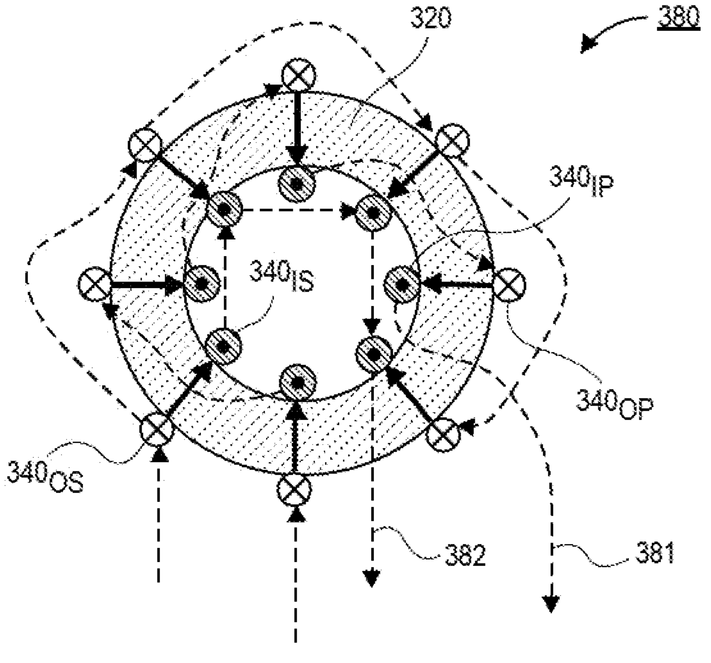
FIG. 3B is a schematic illustration of a transformer with a 4:1 turn ratio, where the secondary winding includes a plurality of parallel segments, in accordance with an embodiment.

Accordingly, embodiments disclosed herein may also comprise a secondary winding that includes a single turn that is formed by a plurality of electrically parallel segments. FIG. 3B is a schematic illustration of a transformer 380 in accordance with such an embodiment. As shown in FIG. 3B, the secondary winding 382 includes a single turn that is partitioned into four electrically parallel segments. Each segment includes a trace above the magnetic core 320 that connects an outer PTH $\mathbf{340}_{OS}$ to an inner PTH $\mathbf{340}_{IS}$. Additionally, all of the outer PTHs $\mathbf{340}_{OS}$ are shorted together, and all of the inner PTHs $\mathbf{340}_{IS}$ are shorted together. Providing the additional segments allows for interleaving a segment between each of the turns of the primary winding 381. As such, the coupling efficiency is greatly improved, even at high turn ratios.

In FIG. 3B, the number of turns in the primary winding 381 is equal to the number of segments in the secondary winding. However, it is to be appreciated that the number of turns in the primary winding 381 do not always need to equal the number of segments in the secondary winding. Each turn of the primary winding may include a PTH $\mathbf{340}_{IP}$ and a PTH $\mathbf{340}_{OP}$. Additionally, each turn in the primary winding 381 may be segmented as well. An example of such an embodiment is shown in FIGS. 4A-4C.

Figure 4A:
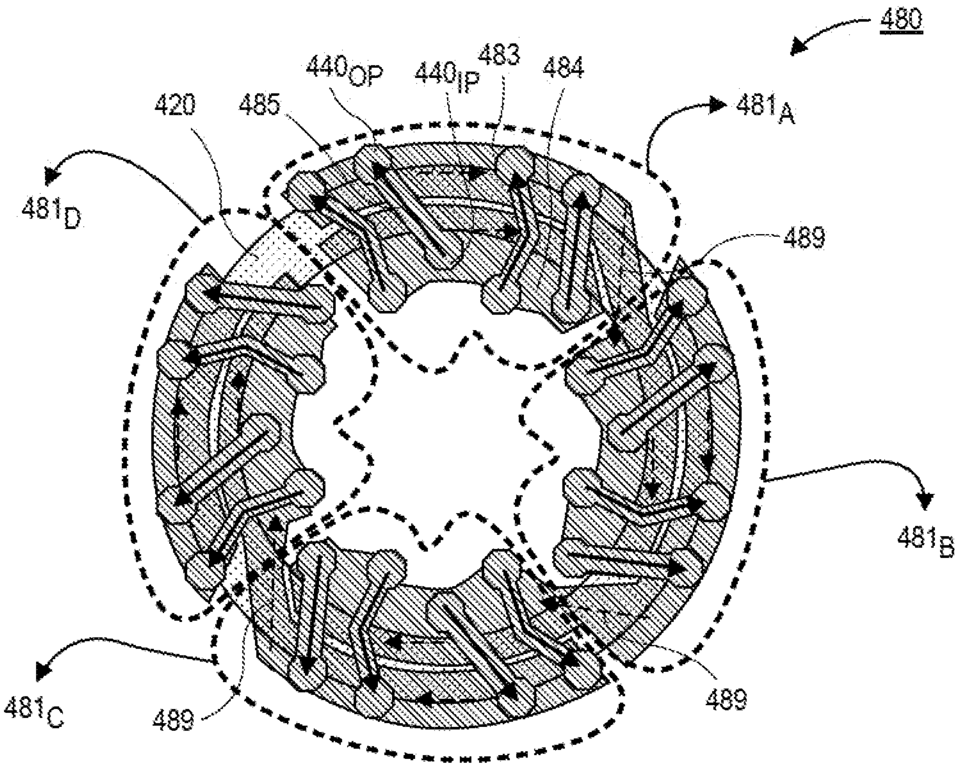
FIG. 4A is a top view illustration of a primary winding with four turns, where each turn comprises a plurality of parallel segments, in accordance with an embodiment.
Figure 4B:
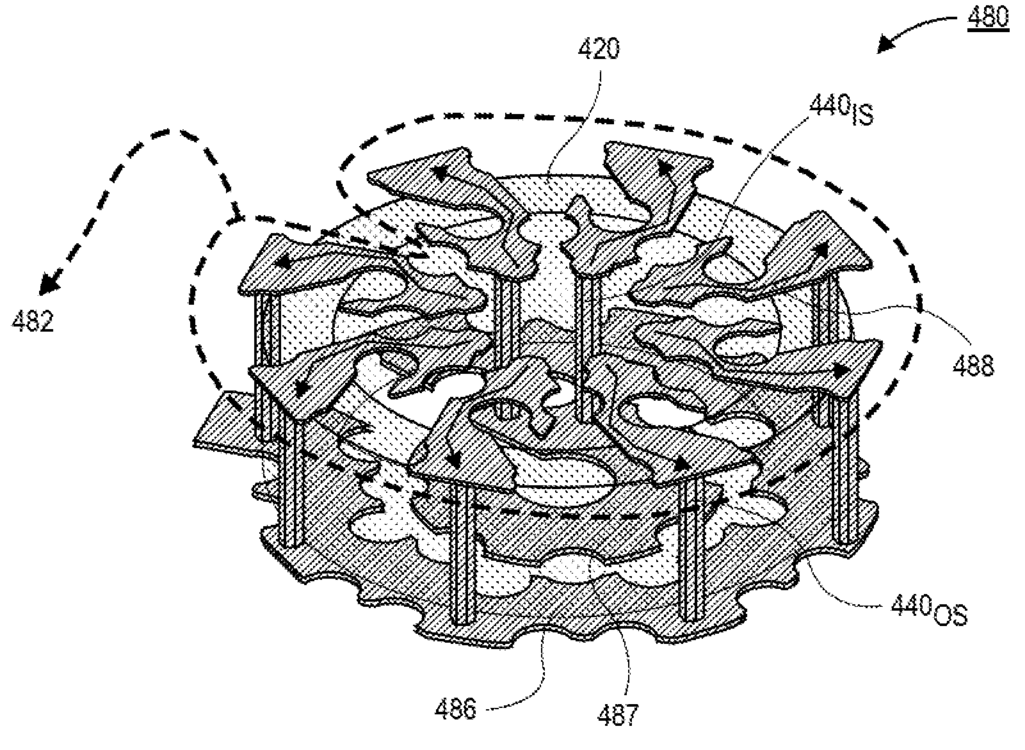
FIG. 4B is a perspective view illustration of a secondary winding with a single turn that includes a plurality of parallel segments, in accordance with an embodiment.
Figure 4C:
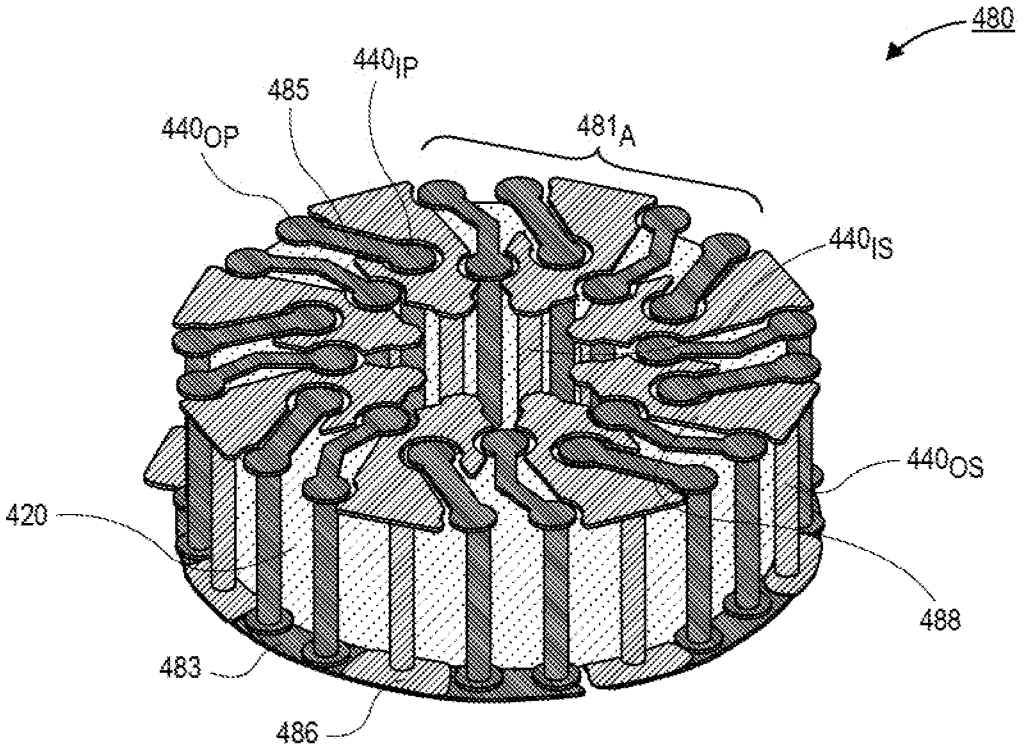
FIG. 4C is a perspective view illustration of a transformer comprising the primary winding and secondary winding illustrated in FIGS. 4A and 4B, in accordance with an embodiment.

Referring now to FIG. 4A, a top view illustration of the primary winding of a transformer 480 is shown, in accordance with an embodiment. In FIG. 4A, the primary winding and the magnetic core 420 are shown in isolation for simplicity. As shown, the primary winding is broken into four turns $\mathbf{481}_{A\text{-}D}$. However, instead of a single loop around the magnetic core 420, each turn $\mathbf{481}_{A\text{-}D}$ is segmented.

In an embodiment, each turn $\mathbf{481}_{A\text{-}D}$ comprises an outer pad 483 and an inner pad 484. The outer pads 483 extend beyond the outer diameter of the magnetic core 420, and the inner pads 484 extend outside an inner diameter of the magnetic core. In an embodiment, each segment includes a plurality of outer PTHs $\mathbf{440}_{OP}$ that extend up from the outer pads 483, and a plurality of inner PTHs $\mathbf{440}_{IP}$ that extend up from the inner pads 484. In an embodiment, each segment further includes a trace 485 that electrically couples the inner PTHs $\mathbf{440}_{IP}$ to the outer PTHs $\mathbf{440}_{OP}$. Since the ends of each segment are connected to the same pads 483/484, the segments are electrically in parallel and function as a single turn.

In an embodiment, the turns $\mathbf{481}_{A\text{-}D}$ may be connected to each other in series. For example, linking traces 489 provide the connection between turns. The linking traces 489 may be on the same layer as the outer pads 483 and the inner pads 484. In an embodiment, the linking traces 489 may start at the outer pad 483 and extend to the inner pad 484 of the next turn 481.

Referring now to FIG. 4B, a perspective view illustration of a secondary winding 482 of the transformer 480 is shown, in accordance with an embodiment. In FIG. 4B, the secondary winding 482 and the magnetic core 420 are shown in isolation in order to not obscure the figure. In an embodiment, the secondary winding 482 includes a single turn with a plurality of parallel segments.

In an embodiment, the secondary winding 482 may comprise an inner pad 487 and an outer pad 486. The inner pad 487 may extend beyond an inner diameter of the magnetic core 420, and the outer pad 486 may extend past an outer diameter of the magnetic core 420. In an embodiment, the inner pad 487 and the outer pad 486 may be provided on a different routing layer than the inner pad 484 and the outer pad 483 of the primary winding.

In an embodiment, each segment of the secondary winding 482 may comprise an inner PTH $\mathbf{440}_{IS}$, an outer PTH $\mathbf{440}_{OS}$, and a trace 488 electrically coupling the inner PTH $\mathbf{440}_{IS}$ to the outer PTH $\mathbf{440}_{OS}$. In an embodiment, the secondary winding 482 may have any number of segments per turn. For example, the illustrated embodiment is shown as having eight segments. In an embodiment, the number of segments of the secondary winding may be equal to the number of turns of the primary winding. In such an embodiment, a single segment of the secondary winding may be interleaved between each turn of the primary winding. In another embodiment, the number of segments of the secondary winding may be an integer multiple of the number of turns of the primary winding. In such an embodiment, a segment of the secondary winding may be provided between each turn of the primary winding, and one or more segments of the secondary winding may be interleaved between segments of a turn in the primary winding. The ability to provide interleaving of many segments of the primary winding and the secondary winding allows for exceptionally high coupling factors, even when the turn ratio is also high.

Referring now to FIG. 4C, a perspective view illustration of a transformer 480 with the primary winding and the secondary winding around the magnetic core 420 is shown, in accordance with an embodiment. In FIG. 4C, the first turn $\mathbf{481}_A$ of the primary winding is highlighted. As shown, a segment of the secondary winding (i.e., inner PTH $\mathbf{440}_{IS}$, trace 488, and outer PTH $\mathbf{440}_{OS}$) is provided on either end of the first turn $\mathbf{481}_A$ and within the first turn $\mathbf{481}_A$. As such, a highly coupled transformer 480 is provided in a compact footprint.

In the embodiment illustrated in FIGS. 4A-4C, the turn ratio is 4:1. However, it is to be appreciated that embodiments are not limited to such turn ratios. For example, FIGS. 5A-5D depict a transformer 580 with an 8:1 turn ratio.

Figure 5A:
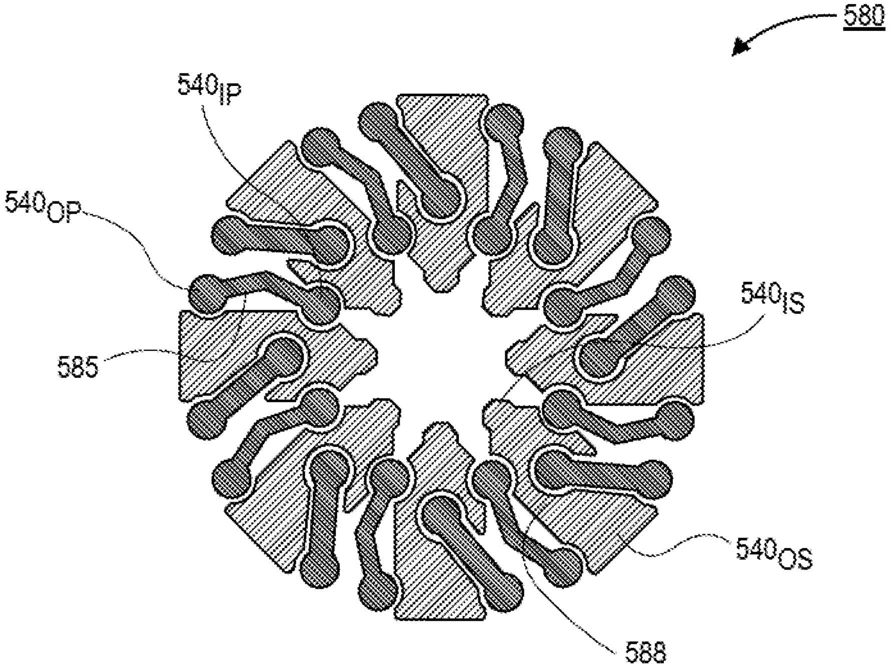
FIG. 5A is a top view illustration of a portion of a transformer in a first routing layer over the package core, in accordance with an embodiment.

Referring now to FIG. 5A, a top view illustration of a transformer 580 is shown, in accordance with an embodiment. The view in FIG. 5A is of a first routing layer over the package substrate core and the magnetic core. Only the first routing layer is shown for simplicity. In an embodiment, the primary winding comprises eight turns with each turn including two segments. For example, the segments of the primary winding include inner PTH $\mathbf{540}_{IP}$, outer PTH $\mathbf{540}_{OP}$, and trace 585. It is to be appreciated that inner PTH $\mathbf{540}_{IP}$ and outer PTH $\mathbf{540}_{OP}$ may be below the illustrated first routing layer and that the pads directly connected to the trace 585 are above the inner PTH $\mathbf{540}_{IP}$ and outer PTH $\mathbf{540}_{OP}$.

In an embodiment, the secondary winding includes a plurality of segments that are connected in parallel (out of the plane of FIG. 5A). Each segment of the secondary winding comprises an inner PTH $\mathbf{540}_{IS}$ and an outer PTH $\mathbf{540}_{OS}$. The inner PTH $\mathbf{540}_{IS}$ is connected to the outer PTH $\mathbf{540}_{OS}$ by a trace 588. It is to be appreciated that inner PTH $\mathbf{540}_{IS}$ and outer PTH $\mathbf{540}_{OS}$ may be below the illustrated first routing layer and that the pads directly connected to the trace 588 are above the inner PTH $\mathbf{540}_{IS}$ and outer PTH $\mathbf{540}_{OS}$.

In an embodiment, the segments of the secondary winding are interleaved between each turn of the primary winding. That is, two segments of a turn of the primary winding (e.g., traces 585) may be adjacent to each other, and traces 588 of the secondary winding may bracket the two traces 585 of the turn of the primary winding.

Figure 5B:
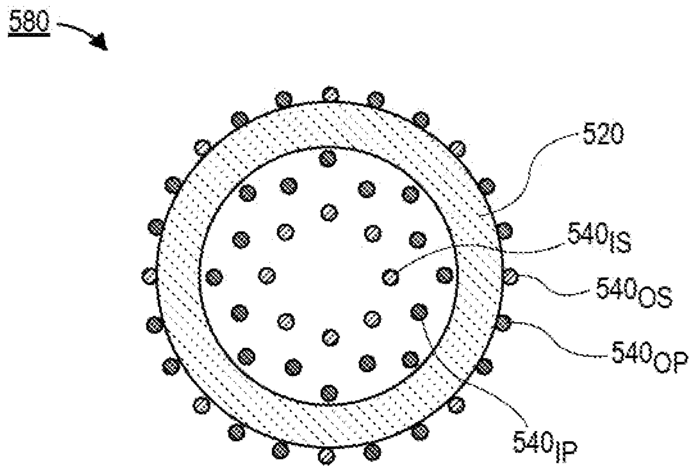
FIG. 5B is a top view illustration of a portion of the transformer in the package core, in accordance with an embodiment.

Referring now to FIG. 5B, a top view illustration of the transformer 580 through the package substrate core is shown, in accordance with an embodiment. In an embodiment, a magnetic core 520 is embedded in the package substrate core. The package substrate core is omitted from FIG. 5B for clarity. The magnetic core 520 may have a toroidal shape with an inner diameter and an outer diameter. In other embodiments, the magnetic core 520 may have other shapes suitable for accommodating a primary winding and a secondary winding.

As shown, the PTHs 540 pass through the package substrate core. PTHs $\mathbf{540}_{OP}$ and $\mathbf{540}_{OS}$ are provided outside the outer diameter of the magnetic core 520, and PTHs $\mathbf{540}_{IP}$ and $\mathbf{540}_{IS}$ are provided inside an inner diameter of the magnetic core 520. In an embodiment, the outer PTHs $\mathbf{540}_{OP}$ and $\mathbf{540}_{OS}$ may all be positioned a substantially equal distance from an axial center of the transformer 580. In an embodiment, the inner PTHs $\mathbf{540}_{IS}$ may be positioned closer to the axial center of the transformer 580 than the inner PTHs $\mathbf{540}_{IP}$.

Figure 5C:
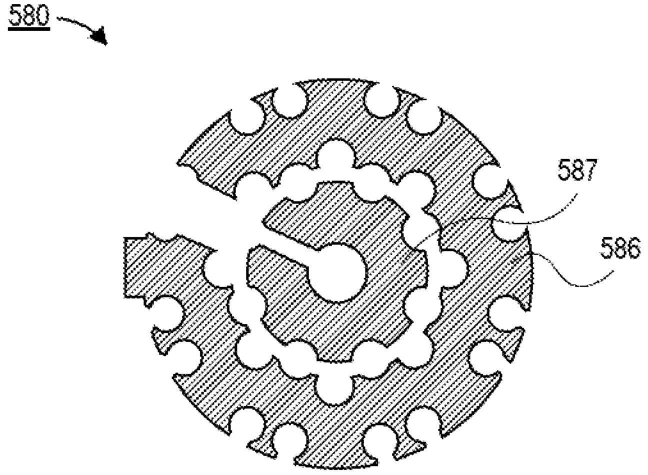
FIG. 5C is a top view illustration of a portion of the transformer in a second routing layer below the package core, in accordance with an embodiment.

Referring now to FIG. 5C, a top view illustration of the transformer 580 through a second routing layer is shown, in accordance with an embodiment. The second routing layer may be provided below the magnetic core and the package substrate core. That is, the second routing layer is on an opposite side of the magnetic core from the first routing layer. The second routing layer may be immediately adjacent to the package substrate core, or there may be one or more routing layers between the package substrate core and the second routing layer.

In an embodiment, portions of the secondary winding are provided in the second routing layer. For example, an inner pad 587 and an outer pad 586 are provided in the second routing layer. The inner pad 587 is electrically coupled to each of the inner PTHs $\mathbf{540}_{IS}$, and the outer pad 586 is electrically coupled to each of the outer PTHs $\mathbf{540}_{OS}$. As such, the inner PTHs $\mathbf{540}_{IS}$ are electrically in parallel, and the outer PTHs $\mathbf{540}_{OS}$ are electrically in parallel. As such, the secondary winding provides single turn with a plurality of electrically parallel segments.

Figure 5D:
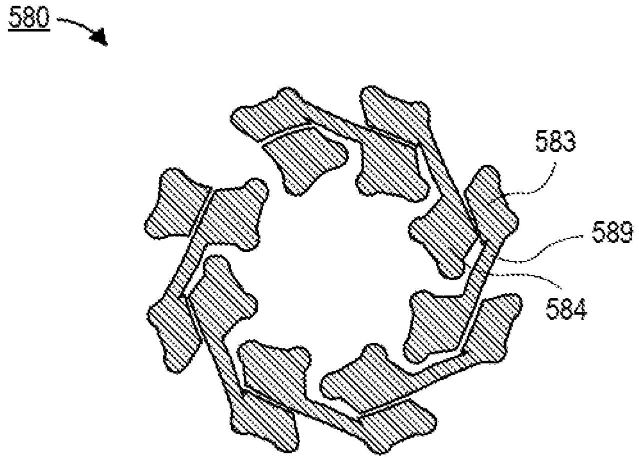
FIG. 5D is a top view illustration of a portion of the transformer in a third routing layer below the second routing layer, in accordance with an embodiment.

Referring now to FIG. 5D, a top view illustration of the transformer 580 through a third routing layer is shown, in accordance with an embodiment. The third routing layer may be provided below the second routing layer. The third routing layer may be immediately adjacent to the second routing layer, or there may be one or more routing layers between the second routing layer and the third routing layer.

In an embodiment, portions of the primary winding are provided in the third routing layer. For example, inner pads 584 and outer pads 583 are provided in the third routing layer. Each inner pad 584 may be coupled to a pair of inner PTHs $\mathbf{540}_{IP}$, and each outer pad 583 may be coupled to a pair of outer PTHs $\mathbf{540}_{OP}$. The PTHs 540 may be coupled to the pads 583 and 584 by vias that pass through the second routing layer.

As shown, there are eight pairs of inner pads 584 and outer pads 583. This provides a total of eight turns for the primary winding, with each turn comprising a plurality of segments. In an embodiment, the turns are electrically connected to each other in series by a linking trace 589 in the third routing layer. The linking trace 589 connects an outer pad 583 of a first turn to an inner pad 584 of a second turn.

In FIGS. 4A-4C and 5A-5D, the secondary winding is shown as having a single turn comprising a plurality of parallel segments. However, it is to be appreciated that the secondary winding may include more than one turn. Additional turns may be provided by replacing the single inner pad 587 and the single outer pad 586 with multiple inner and outer pads that are connected in series by a linking trace (similar to the linking trace 589 in FIG. 5D). As such, turn ratios may include even greater flexibility, such as, but not limited to, 3:2, 4:3, and 5:4.

Figure 6:
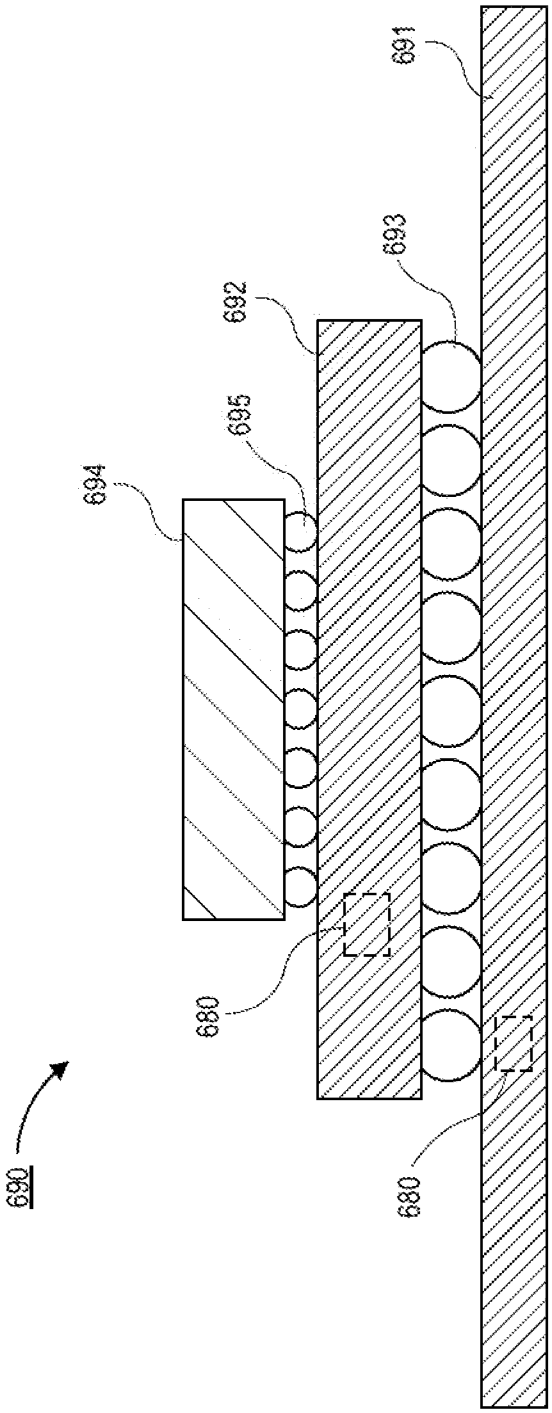
FIG. 6 is a cross-sectional illustration of an electronic system with a package substrate that comprises a transformer, in accordance with an embodiment.

Referring now to FIG. 6, a cross-sectional illustration of an electronic system 690 is shown, in accordance with an embodiment. In an embodiment, the electronic system 690 comprises a board 691. The board 691 may be a printed circuit board (PCB) or the like. An electronic package 692 may be electrically coupled to the board 691 by interconnects 693. The interconnects 693 are shown as solder balls. However, it is to be appreciated that any interconnect architecture may be used, such as sockets, or the like. In an embodiment, a die 694 is coupled to the electronic package 692 by interconnects 695. The interconnects 695 may be any first level interconnects (FLI).

In an embodiment, one or both of the electronic package 692 and the board 691 may comprise a transformer 680 (indicated with a dashed box). The transformers of the electronic package 692 and the board 691 may be transformers similar to those described above. For example, the transformers 680 may include highly coupled primary and secondary windings. In an embodiment, the transformers 680 may comprise a secondary winding that includes a plurality of segments that are electrically in parallel to provide a single turn. In an embodiment, the primary winding may comprise a plurality of turns. In some embodiments, the each turn of the primary winding may also comprise a plurality of electrically parallel segments.

Figure 7:
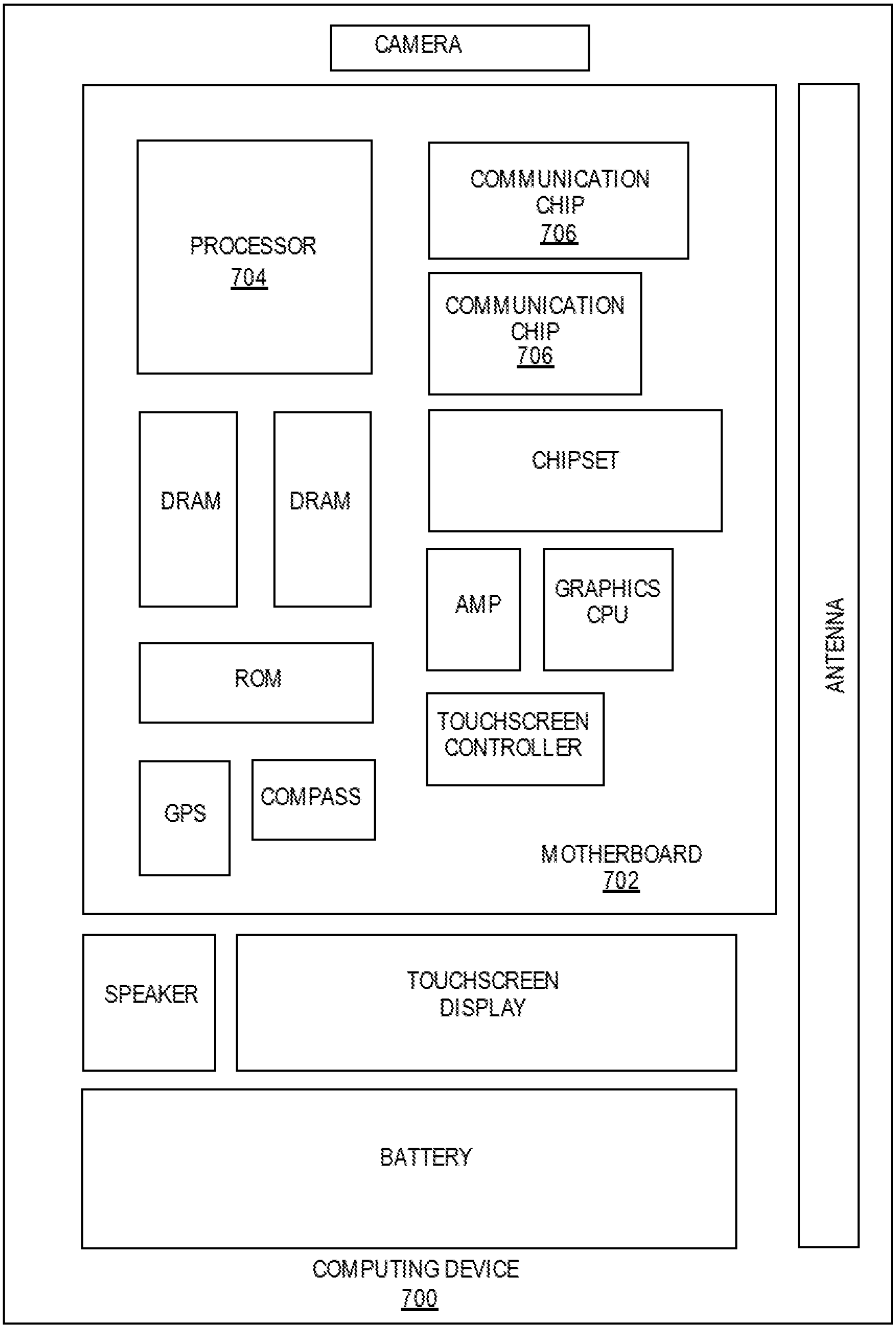
FIG. 7 is an illustration of a schematic block diagram illustrating a computer system that utilizes an transformer, according to one embodiment.

FIG. 7 illustrates a computing device 700 in accordance with one implementation of the invention. The computing device 700 houses a board 702. The board 702 may include a number of components, including but not limited to a processor 704 and at least one communication chip 706. The processor 704 is physically and electrically coupled to the board 702. In some implementations the at least one communication chip 706 is also physically and electrically coupled to the board 702. In further implementations, the communication chip 706 is part of the processor 704.

These other components include, but are not limited to, volatile memory (e.g., DRAM), non-volatile memory (e.g., ROM), flash memory, a graphics processor, a digital signal processor, a crypto processor, a chipset, an antenna, a display, a touchscreen display, a touchscreen controller, a battery, an audio codec, a video codec, a power amplifier, a global positioning system (GPS) device, a compass, an accelerometer, a gyroscope, a speaker, a camera, and a mass storage device (such as hard disk drive, compact disk (CD), digital versatile disk (DVD), and so forth).

The communication chip 706 enables wireless communications for the transfer of data to and from the computing device 700. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 706 may implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond. The computing device 700 may include a plurality of communication chips 706. For instance, a first communication chip 706 may be dedicated to shorter range wireless communications such as Wi-Fi and Bluetooth and a second communication chip 706 may be dedicated to longer range wireless communications such as GPS, EDGE, GPRS, CDMA, WiMAX, LTE, Ev-DO, and others.

The processor 704 of the computing device 700 includes an integrated circuit die packaged within the processor 704. In some implementations of the invention, the integrated circuit die of the processor may be coupled to an electronic package with a highly coupled transformer, in accordance with embodiments described herein. The term "processor" may refer to any device or portion of a device that processes electronic data from registers and/or memory to transform that electronic data into other electronic data that may be stored in registers and/or memory.

The communication chip 706 also includes an integrated circuit die packaged within the communication chip 706. In accordance with another implementation of the invention, the integrated circuit die of the communication chip may be coupled to an electronic package with a highly coupled transformer, in accordance with embodiments described herein.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize.

These modifications may be made to the invention in light of the above detailed description. The terms used in the following claims should not be construed to limit the invention to the specific implementations disclosed in the specification and the claims. Rather, the scope of the invention is to be determined entirely by the following claims, which are to be construed in accordance with established doctrines of claim interpretation.

Example 1 a power transformer, comprising: a magnetic core that is a closed loop with an inner dimension and an outer dimension; a primary winding around the magnetic core, wherein the primary winding has a first number of first turns connected in series around the magnetic core; and a secondary winding around the magnetic core, wherein the secondary winding has a second number of second turns around the magnetic core, wherein individual ones of the second turns comprise a plurality of secondary segments connected in parallel.

Example 2 the power transformer of Example 1, wherein the plurality of secondary segments are interleaved with the first turns.

Example 3 the power transformer of Example 1 or Example 2, wherein the magnetic core is a toroidal shape.

Example 4 the power transformer of Examples 1-3, wherein individual ones of the first turns comprise a plurality of primary segments connected in parallel.

Example 5 the power transformer of Example 4, wherein individual ones of the secondary segments are interleaved between primary segments of a single first turn.

Example 6 the power transformer of Examples 1-5, wherein a number of secondary segments of individual ones of the second turns is equal to the first number of first turns.

Example 7 the power transformer of Examples 1-6, wherein the first number of first turns is an integer multiple of the second number of second turns.

Example 8 the power transformer of Example 7, wherein the first number of first turns is four or eight, and the second number of second turns is one.

Example 9 the power transformer of Examples 1-8, wherein the magnetic core is embedded in a core layer of a package substrate.

Example 10 an electronic package, comprising: a package core layer; a magnetic core embedded in the package core layer, wherein the magnetic core comprises an inner diameter and an outer diameter; a plurality of routing layers above and below the package core layer; a primary winding around the magnetic core, wherein the primary winding has a first number of first turns; a secondary winding around the magnetic core, wherein the secondary winding has a second number of second turns, and wherein individual ones of the second turns comprise a plurality of secondary segments connected in parallel; and wherein horizontal portions of the primary winding and the secondary winding are provided in the plurality of routing layers, and wherein vertical portions of the primary winding and the secondary winding comprise plated through holes through the package core layer.

Example 11 the electronic package of Example 10, wherein the first number of first turns is an integer multiple of the second number of second turns.

Example 12 the electronic package of Example 11, wherein the first number of first turns is four or eight, and wherein the second number of second turns is one.

Example 13 the electronic package of Examples 10-12, wherein the secondary segments are interleaved with the first turns.

Example 14 the electronic package of Examples 10-13, wherein individual ones of the second turns comprise: a first pad in a first routing layer inside the inner diameter of the magnetic core; a second pad in the first routing layer outside of the outer diameter of the magnetic core; and wherein individual ones of the secondary segments comprise: a first plated through hole electrically coupling the first pad to a second routing layer on an opposite side of the package core layer; a secondary trace in the second routing layer; and a second plated through hole electrically coupling the secondary trace to the second pad.

Example 15 the electronic package of Example 14, wherein individual ones of the first turns are electrically coupled to each other in series by a linking trace in a third routing layer adjacent to the first routing layer.

Example 16 the electronic package of Example 14, wherein individual ones of the first turns comprise a plurality of primary segments connected in parallel.

Example 17 the electronic package of Example 16, wherein individual ones of the first turns comprise: a third pad in a third routing layer inside the inner diameter of the magnetic core, wherein the third routing layer is adjacent to the first routing layer; a fourth pad in the third routing layer outside of the outer diameter of the magnetic core; and wherein individual ones of the primary segments comprise: a third plated through hole electrically coupling the third pad to the second routing layer on the opposite side of the package core layer; a primary trace in the second routing layer; and a fourth plated through hole electrically coupling the primary trace to the fourth pad.

Example 18 the electronic package of Example 17, wherein individual ones of the secondary segments are interleaved between primary segments of a single first turn.

Example 19 the electronic package of Examples 10-18, wherein a number of secondary segments of individual ones of the second turns is equal to the first number of first turns.

Example 20 the electronic package of Examples 10-19, wherein a number of secondary segments of each second turn is an integer multiple of the first number of first turns.

Example 21 the electronic package of Examples 10-20, wherein the magnetic core is a toroidal shape.

Example 22 an electronic system, comprising: a die; an electronic package coupled to the die, wherein the electronic package comprises a power transformer, wherein the power transformer comprises: a magnetic core with an inner diameter and an outer diameter; a primary winding around the magnetic core, wherein the primary winding has a first number of first turns connected in series around the magnetic core; and a secondary winding around the magnetic core, wherein the secondary winding has a second number of second turns around the magnetic core, wherein individual ones of the second turns comprise a plurality of secondary segments connected in parallel.

Example 23 the electronic system of Example 22, wherein the power transformer is part of an isolated switched-mode power supply (SMPS), wherein the isolated SMPS is configured to transfer the full power of a converter through the power transformer.

Example 24 the electronic system of Example 23, wherein the isolated SMPS is a fly-back converter topology, a forward converter topology, or a full-bridge converter topology.

Example 25 the electronic system of Examples 22-24, wherein the first number of first turns is four or eight, and the second number of second turns is one.

What is claimed is:

1. A power transformer, comprising:

a magnetic core that is a closed loop with an inner dimension and an outer dimension;

a primary winding around the magnetic core, wherein the primary winding has a first number of first turns connected in series around the magnetic core; and a secondary winding around the magnetic core, wherein the secondary winding has a second number of second turns around the magnetic core, wherein individual ones of the second turns comprise a plurality of secondary segments connected in parallel, wherein the plurality of secondary segments are interleaved with pairs of the first turns.

2. The power transformer of claim 1, wherein the magnetic core is a toroidal shape.

3. The power transformer of claim 1, wherein individual ones of the first turns comprise a plurality of primary segments connected in parallel.

4. The power transformer of claim 3, wherein individual ones of the secondary segments are interleaved between primary segments of a single first turn.

5. The power transformer of claim 1, wherein a number of secondary segments of individual ones of the second turns is equal to the first number of first turns.

6. The power transformer of claim 1, wherein the first number of first turns is an integer multiple of the second number of second turns.

7. The power transformer of claim 6, wherein the first number of first turns is four or eight, and the second number of second turns is one.

8. The power transformer of claim 1, wherein the magnetic core is embedded in a core layer of a package substrate.

* * * * *